(12) United States Patent
Freedman et al.

(10) Patent No.: US 7,427,771 B2
(45) Date of Patent: *Sep. 23, 2008

(54) UNIVERSAL GATES FOR ISING TQFT VIA TIME-TILTED INTERFEROMETRY

(75) Inventors: Michael H. Freedman, Redmond, WA (US); Chetan V. Nayak, Santa Monica, CA (US)

(73) Assignee: Mircosoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/942,518

(22) Filed: Nov. 19, 2007

(65) Prior Publication Data

US 2008/0067496 A1 Mar. 20, 2008

Related U.S. Application Data

(63) Continuation of application No. 11/245,964, filed on Oct. 7, 2005, now Pat. No. 7,321,131.

(51) Int. Cl.
*H01L 29/06* (2006.01)
*H01L 21/00* (2006.01)

(52) U.S. Cl. .............................. 257/9; 257/12; 257/14; 438/800

(58) Field of Classification Search ...................... 257/2, 257/12, 14, 9; 438/800
See application file for complete search history.

(56) References Cited

U.S. PATENT DOCUMENTS 7,109,593 B2    9/2006  Freedman et al. ........... 257/798
7,250,624 B1    7/2007  Freedman et al. ............. 257/12
7,321,131 B2 *  1/2008  Freedman et al. ............... 257/9
2006/0022190 A1 2/2006 Freedman et al. ............. 257/30
2006/0033097 A1 2/2006 Freedman et al. ............. 257/34
2006/0043423 A1 3/2006 Freedman et al. ........... 257/202
2006/0045269 A1 3/2006 Freedman et al. .......... 380/264
2006/0091375 A1 5/2006 Freedman et al. ............... 257/9
2007/0162407 A1 7/2007 Freedman et al. ............. 706/29

FOREIGN PATENT DOCUMENTS

WO    WO 03/49197 A1    6/2003

OTHER PUBLICATIONS

Bravyi, S.B. et al., "Quantum Invariants of 3-Manifolds and Quantum Computation", *California Institute of Technology*, Nov. 2000, 28 pages.
Das Sarma, Sankar et al, "Topologically-Protected Qubits from a Possible Non-Abelian Fractional Quantum Hall State", Dec. 22, 2004, 5 pages.

(Continued)

*Primary Examiner*—Evan Pert
(74) *Attorney, Agent, or Firm*—Woodcock Washburn LLP

(57) ABSTRACT

Experiments suggest that the mathematically weakest non-abelian TQFT may be physically the most robust. Such TQFT's—the v=5/2 FQHE state in particular—have discrete braid group representations, so one cannot build a universal quantum computer from these alone. Time tilted interferometry provides an extension of the computational power (to universal) within the context of topological protection. A known set of universal gates has been realized by topologically protected methods using "time-tilted interferometry" as an adjunct to the more familiar method of braiding quasi-particles. The method is "time-tilted interferometry by quasiparticles." The system is its use to construct the gates {g1, g2, g3}.

20 Claims, 12 Drawing Sheets

OTHER PUBLICATIONS

Freedman, et al., "Tilted Interferometry Realizes Universal Quantum Computation in the Ising TQFT without Overpass", arXiv:cond-mat/0512072v1 [cond-mat-mes-hall] Dec. 5, 2005, 23 pages.

Fujioka, H., "Detection of Edge-Conducting Channels in Quantum Hall Systems Using a Single-Electron Transistor", *Japanese Journal of Applied Physics*, 2001, 40(3B), 2073-2076.

Kawahigassi, Y. et al., "(2+1) Dimensional Topological Quantum Field Theory from Subfactors and Dehn Surgery Formula for 3-Manifold Invariants", *Advances in Mathematics*, 2005, 195(1), 165-204.

Masubuchi, S. et al., "Estimation of Electrically-Pumped Dynamic Nuclear Polarization in a Quantum Hall Device using Tilted Magnetic Fields", *Japanese Journal of Applied Physics*, 2006, 45(20), L522-L524.

Tsui, D.C. et al., "The Fractional Quantum Hall Effect", *IEEE Journal of Quantum Electronics*, 1986, QE-22(9), 1711-1719.

* cited by examiner

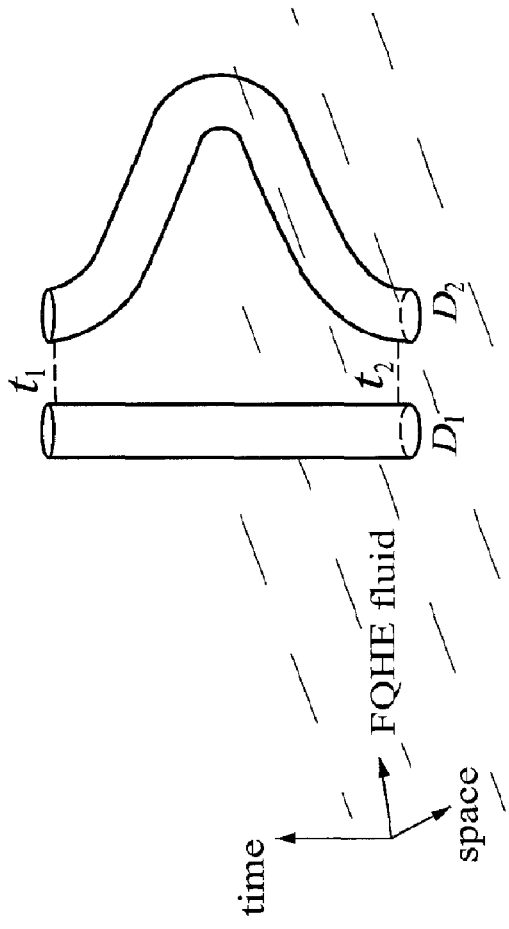
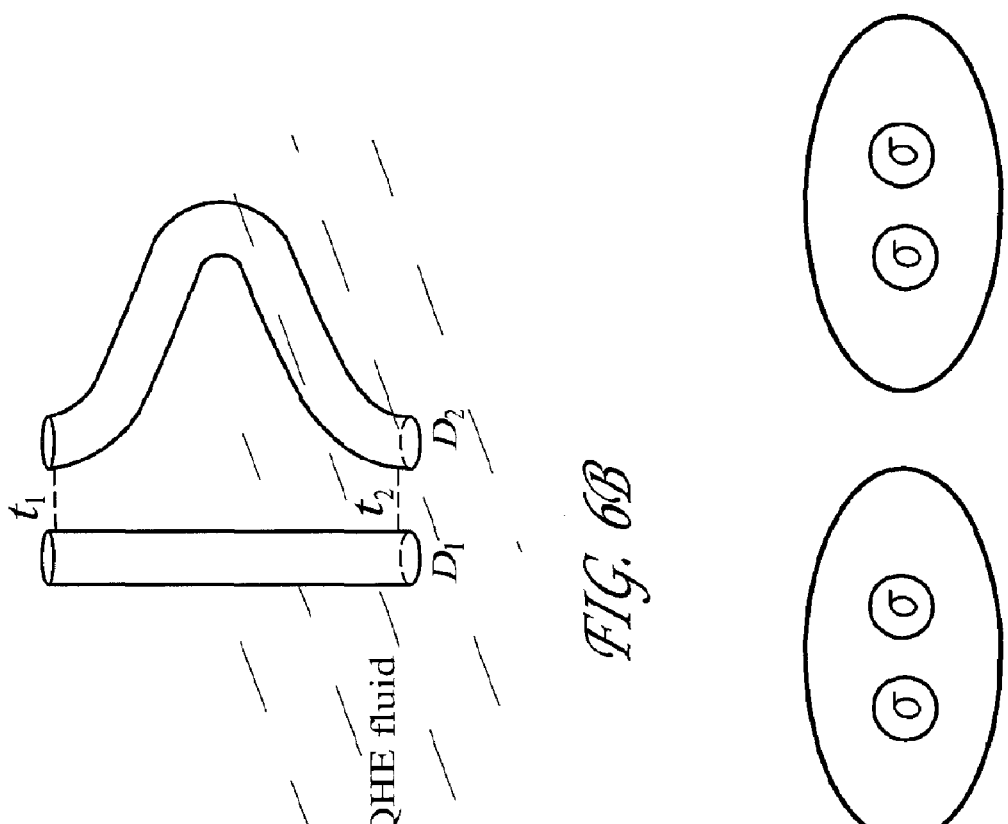
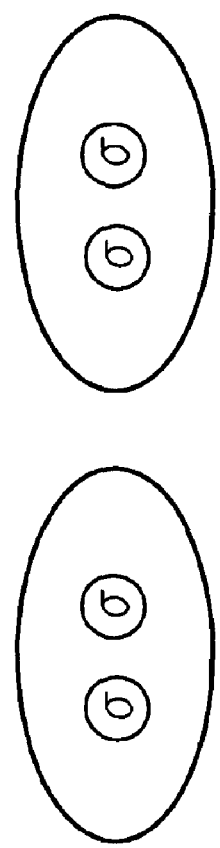
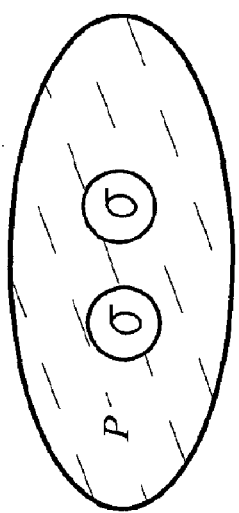
FIG. 6A
FIG. 6B
FIG. 7
FIG. 8

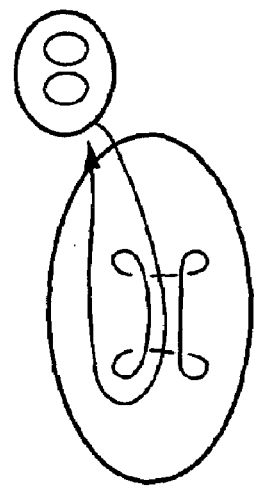
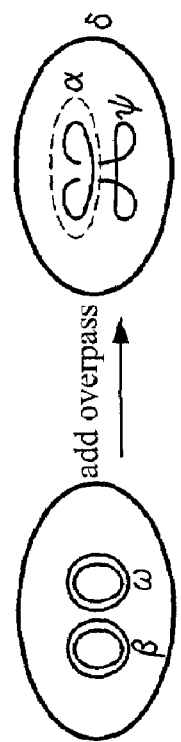
FIG. 9
FIG. 10
FIG. 11
FIG. 12

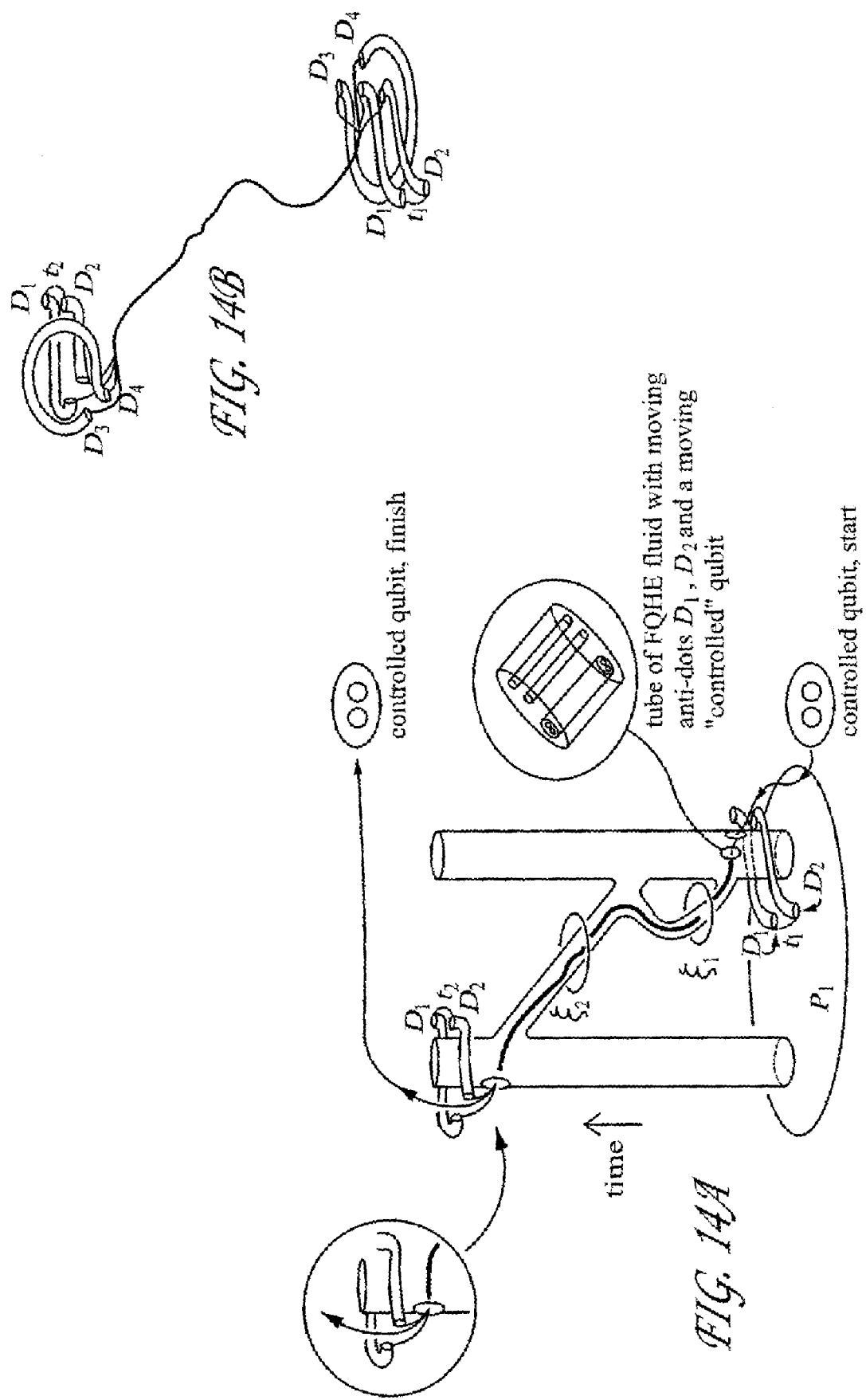

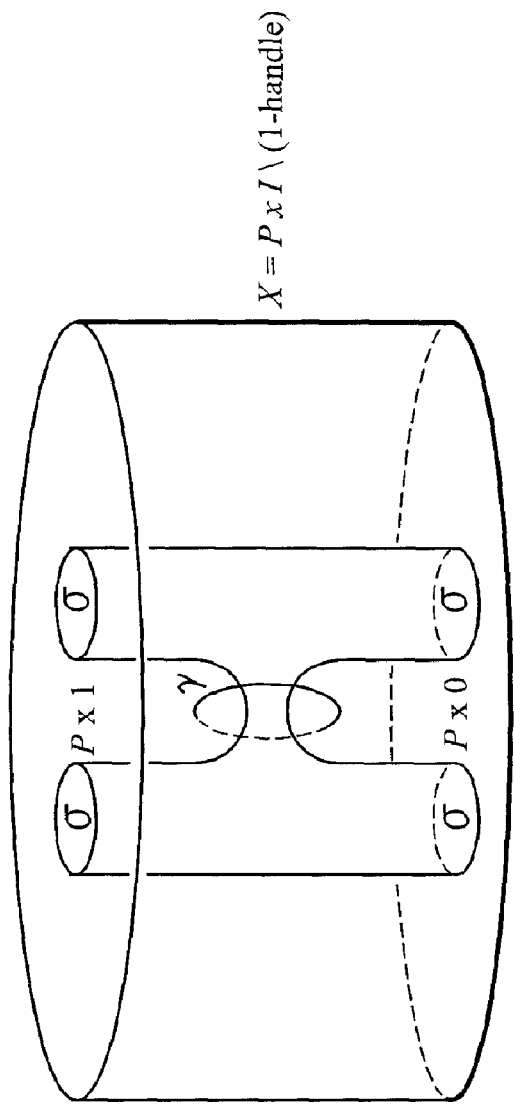
FIG. 22
FIG. 23A
FIG. 23B

UNIVERSAL GATES FOR ISING TQFT VIA TIME-TILTED INTERFEROMETRY

CROSS-REFERENCE TO RELATED APPLICATIONS

This application is a continuation of U.S. patent application Ser. No. 11/245,964, filed Oct. 7, 2005.

BACKGROUND

In Quantum invariants of 3-manifolds and quantum computation ("BK"), Bravyi and Kitaev constructed a universal set of gates $\{g_1, g_2, g_3\}$ for the Ising TQFT, the principle component of the Moore Read model for $$\nu = \frac{5}{2} - FQHE,$$

in an abstract context in which there were no restrictions on the global topology of the space-time. Gate $g_1$ may be referred to as a $\pi/4$ phase gate. Gate $g_2$ may be referred to as a controlled $\pi$ phase gate. Gate $g_3$, which has no real name, may be used for braiding.

For a laboratory device, the relevant space-time should embed in $R^2 \times R^1$. It seems almost certain that simply adding this constraint to the Bravyi/Kitaev context prevents the construction of a complete gate set. However, if a certain assumption is added to their model—i.e., that the topological changes 1, σ and ε can be distinguished on a simple (framed) loop γ in space-time—then $\{g_1, g_2, g_3\}$ may be realized in 2+1 dimensions. Projecting to the charge sectors 1, σ and ε extends the discussion of Topologically-Protected Qubits from a Possible Non-Abelian Fractional Quantum Hall State, by Das Sarma, Freedman, and Nayak ("DFN"), in which interferometry was proposed to distinguish the 1 and ε changes. By an extension of DFN, an interferometry measurement should be able to resolve the identity into the sum of three projectors: $1d = \hat{1} \oplus \hat{\sigma} \oplus \hat{\varepsilon}$. A further generalization, however, is needed.

SUMMARY

A logical gate for a quantum computer can be achieved by forming a Polyakov loop in the space-time of a fractional quantum Hall effect (FQHE) fluid, and determining a charge on the Polyakov loop. Time-tilted interferometry provides a mechanism by which to measure charge on Polyakov loops, which extend over time and cannot be deformed into a single time slice. Measuring charge on Polyakov loops is equivalent to using exotic topologies as in BK. The jump from the physically-impossible world of BK to the physically possible world is the recognition that measuring the charge on the Polyakov loops is the equivalent of BK's exotic topologies. Thus, a probabilistic realization of BK's gates can be achieved with enough fidelity to be tantamount to a realization of BK's gates.

To break the fluid, a current may be injected at the first antidot at a first time. The voltage may be turned on at a later time to create a gap (thus beginning the formation of a Polyakov loop). The voltage may be removed at a still later time to heal the gap (thus closing the Polyakov loop). The current may then be removed to ground and measured. Measurement of the output current will cause the "particle" to converge to an eigenstate (i.e., |1> or |ε>). If the measured current is relatively high, then the Polyakov loop is in a first state (e.g., |1> or |ε>). If the measured current is relatively low, then the Polyakov loop is in a second state (e.g., |1> or |ε>, respectively).

By adding gammas, one can determine whether a |1> or |ε> particle is in the Polyakov loop. It should be understood that there may never really be an epsilon particle in the Polyakov loop, but it behaves as if there is. Using time-tilted interferometry, one can determine whether the Polyakov loop is in a |1> state or and |ε> state.

There is no tunneling path when the fluid is broken. The fluid may be broken by increasing the voltage on a gate to separate the Hall bar into two smaller bars. It should be understood that an actual break in the fluid is not necessary. Any separation of the anti-dots (e.g., electrically or spatially) so that no tunneling can occur is sufficient.

A particle can start to tunnel before the bar is broken, linger between the antidots while the gap is present, and get across to the other antidot after the gap is repaired. Likewise, a particle can start to tunnel before the bar is broken, and get past the area where the Polyakov loop is formed, but have an amplitude such that it lingers on the other side of the loop until the gap is closed before getting to the second antidot.

It should be understood that there might be a classical electromagnetic contribution that needs to be calibrated out. That is, classical phase shifts must be calibrated away. To calibrate, the bar is not broken (equivalent to having |1> particle, which is no particle at all). The current drawn out to ground can be measured in the absence of a break in the fluid. Then, the fluid can be broken, a determination can be made as to whether anything changed as a result. If nothing changes, then the particle is in a |1> state. If the current changes, then the particle is in an |ε> state. Accordingly, in operation, if the measured current is the same as the calibrated current, then the particle is in a |1> state. Otherwise, the particle is in an |ε> state.

BRIEF DESCRIPTION OF THE DRAWINGS

FIGS. 6A and 6B depict geometry for interferometry around a loop using one fixed anti-dot and one moving anti-dot.

FIG. 7 depicts a twice-punctured disk or "pants."

FIG. 8 depicts a representation of qubits.

FIG. 9 depicts a compact representation of qubits as for Wilson (Abrikosov) loop segments.

FIG. 10 depicts a representation that follows from the braiding rules of the Ising TQFT.

FIG. 11 depicts the sum of charges on two boundary components.

FIG. 12 depicts an overpass.

FIGS. 14A and 14B depict a realization of a $\pi/4$ phase gate $g_2$.

FIG. 22 depicts the probability for γ to carry charge 1(ε).

FIGS. 23A and 23B depict FIG. 22 in particle flight (Feynmann diagram) notation according to the charge of γ.

DETAILED DESCRIPTION

To realize gates $g_1$ and $g_2$ one must measure interference between paths $\gamma_1$ and $\gamma_2$, which cannot simultaneously be projected into any (planar) space-time-slice. The techniques described herein are analogous to a "twinkling" double slit experiment where the two slits rapidly open and close and though never simultaneously open, produce an interference pattern. Such a technique may be referred to as "tilted interferometry" since the loop $\gamma = \gamma_1 \cup \gamma_2^{-1}$ may have the property that it cannot be deformed into any single time-slice and so is tilted in space-time. It has been suggested that "tilted interferometry" is analogous to the second, electric Arharonov-Bohm effect, where case $A_0$, must vary in time as the particle passes. As described below, the domain of the FQHE fluid will vary in time. It should be understood that interferometry may not be possible along any knotted loop γ, but only fairly simple γs are necessary. To build the gates $g_1$ and $g_2$, the link along which interferometry is done has only one local max (min) per component, i.e., is the "plat of a pure braid." The third gate, $g_3$, is a simple braid generator and requires no discussion here.

For reference:

$$g_1 = \begin{vmatrix} 1 & 0 \\ 0 & e^{\pi i/4} \end{vmatrix}, g_2 = \begin{vmatrix} 1 & 0 & 0 & 0 \\ 0 & 1 & 0 & 0 \\ 0 & 0 & 1 & 0 \\ 0 & 0 & 0 & -1 \end{vmatrix},$$

and $$g_3 = \begin{vmatrix} 1 & 0 & 0 & i \\ 0 & 1 & i & 0 \\ 0 & i & 1 & 0 \\ i & 0 & 0 & 1 \end{vmatrix}$$

The Possibilities for Interferometry on the Ising TQFT

In this section, we briefly describe model experiments in the context of $$v = \frac{5}{2} FQHE,$$

some of which will be used to construct $g_1$ and $g_2$ as described below. Let us begin without the time tilt. Consider a disk of $$v = \frac{5}{2} FQHE$$

material in which current is injected at A, withdrawn at B and C. Tunneling paths $t_1$ and $t_2$ are marked. An unknown topological charge resides on the antidot X.

Figure 1A:
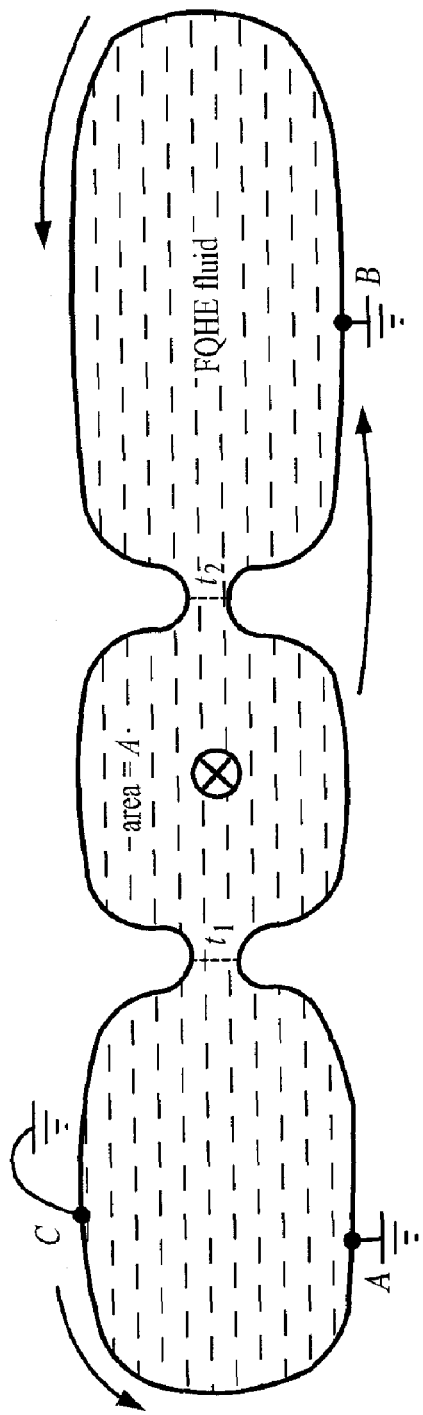
FIGS. 1A and 1B depict a FQHE fluid on the inside and outside, respectively, of the bounding edge(s).
Figure 1B:
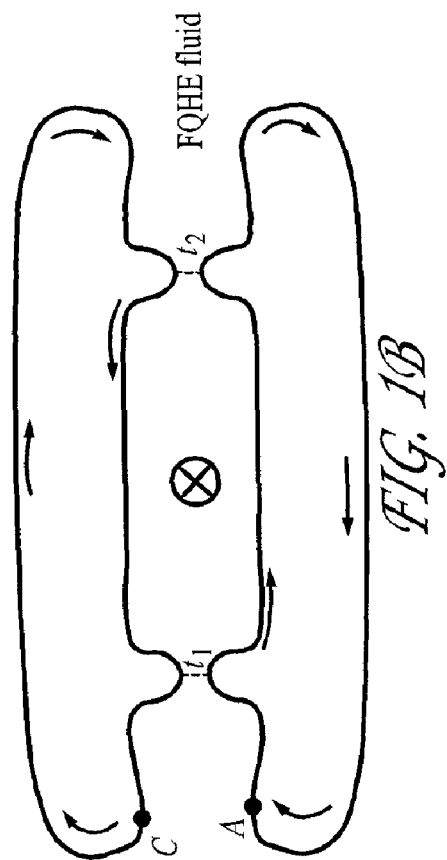
Figures 2, 3:
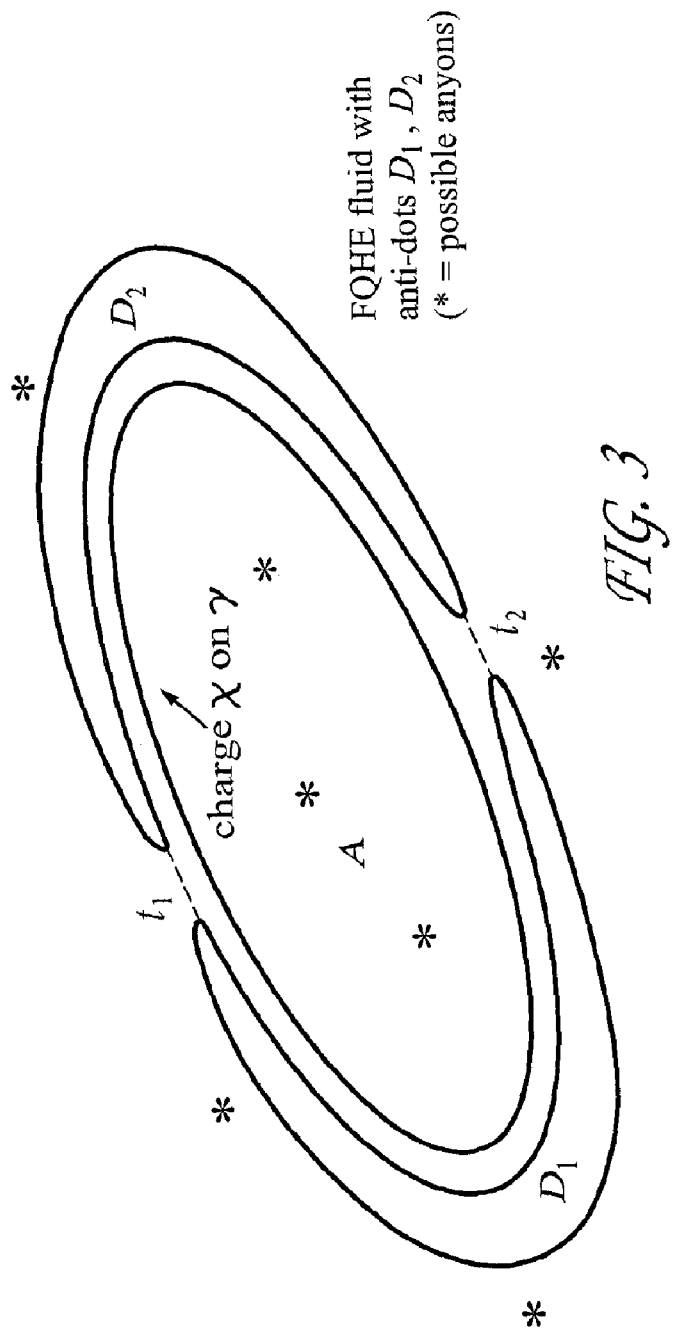
FIG. 2 depicts contributions from two tunneling paths for σ particles.
FIG. 3 depicts a plane filled with FQHE fluid except for two distorted anti-dots.

FIGS. 1A and 1B show two functionally equivalent setups. In FIG. 1A, the FQHE "fluid" is on the "inside" of the bounding edge. In FIG. 1B, the FQHE fluid is on the "outside" of the bounding edges. In space-time "braided tensor category" notation, the two tunneling paths for σ particles contribute as shown in FIG. 2.

We ignore the U(1)-semion charges and the classical B·A phase to concentrate our attention on the more interesting nonabelian Ising charges:

1 = ⫲, σ=|, and ε=| that is, trivial, spin=1/2, and spin=1. Using the Kauffman rules:

$$\times = A )( + A^{-1} \asymp, A = e^{\frac{3\pi i}{8}}$$

which reproduce the Ising rules up to the Frobeneous-Shor indicator a sign which arises in certain formulae but will not effect our results, and $$\times\!\!\!\!\sim = - \times\!\!\!\!\sim.$$

Note that, using $$| = \left\| -\frac{1}{-(A^2 - A^{-2})} \asymp \right\| = \left\| -\frac{1}{d} \asymp \right\|, d = \sqrt{2}$$

the first rule implies the second. We evaluate the interference, FIG. 2, for x=1, σ, and ε, and $t_1 = t_2$.

For x = 1:

Tunneling current = $t_1(\supset) + t_2(\supset) = 2t_1$ in units charge(σ) = $\frac{e}{4}$.

For x = σ:

Tunneling current = $t_1 \Im + t_2(\supset)$, but it would be a mistake to algebraically combine the two processes since they represent orthogonal kets, which may be checked by pairing with external particles histories ⊂ ⊃ and ⊂⊃. The results are $\langle \infty \rangle = 2, \langle \supset \supset \rangle = 0, \langle \supset \supset \rangle = 0,$ and $\langle \supset \supset \rangle = e^{-i\pi/4}\sqrt{2},$ which may be checked from the Kauffman rules (or the S-matrix—given later). Orthogonality implies the norm of the combined processes is independent of the relative phase. This orthogonality means no change in interference with changing area A. As A can be modulated with a side gate, this property should be experimentally accessible.

For x=ϵ:

$$\text{Tunneling current} = t_1'\:)|\rangle + t_2'\overline{)}|\rangle$$
$$= t_1'\:)|\rangle - t_2'\overline{)}|\rangle = 0.$$

Formally these three outcomes for x=1, σ, ϵ are quite distinct. Up to now, we have here only considered the σ-tunneling current. One would also expect a smaller temperature dependent contribution from ϵ-tunneling which would have to be added to the calculations above. There would be terms:

case $x=1$: $t_1'(\:)|\rangle+t_2'(\overline{)}\rangle$,    1.

case $x=\sigma$: $t_1'(\:)|\rangle+t_2'(\overline{\rtimes})$, and   2.

case $x=\epsilon$: $t_1'(\:)|\rangle+t_2'(\overline{\rtimes})=0$   3.

respectively. In any case there is ample independence to expect a relatively simple interferometry measurement around x to project into one of the three sectors 1, σ, or ϵ.

If a simple loop γ lies in a FQHE liquid at time =t we may project onto particle states 1, σ, or ϵ along σ by an experiment which is a geometric distortion of, but topologically identical to, FIG. 1B. FIG. 3 depicts a plane filled with FQHE fluid except for two distorted anti-dots $D_1$ and $D_2$. The asterisks represent quasi-particles. If we could measure the tunneling current between them (and vary area A as we do so), we project to a collective charge 1, σ, or ϵ along γ. The experiment suggested by FIG. 3 is not tilted but describable within a time slice.

Figure 4:
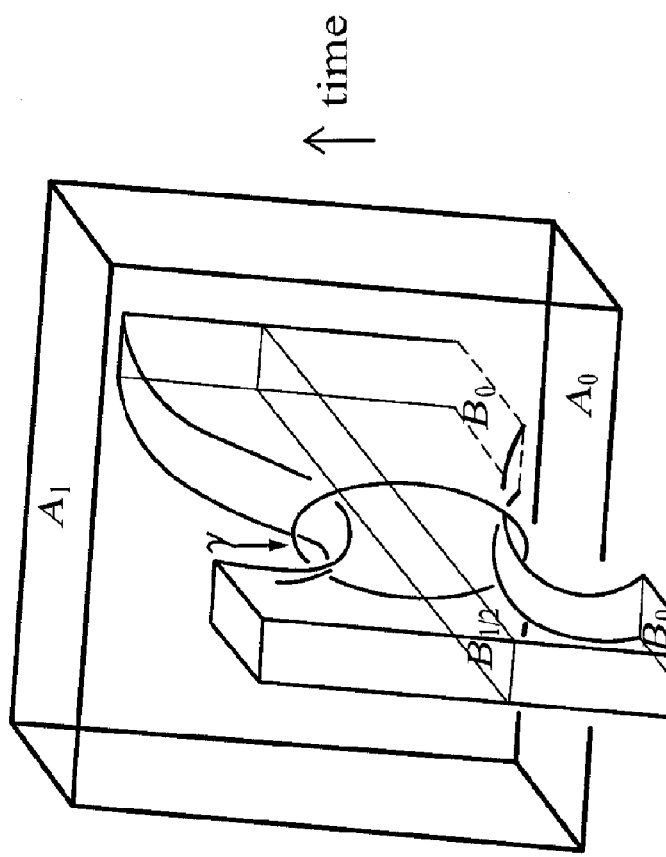
FIG. 4 depicts measurement of charge around a time-like hole in a band of material such as an FQHE fluid.

Let us now take up tilted interferometry with σ particles. The basic ideas is that we expect technological limitations to confine us to planar puddles of FQHE fluids at any times slice (i.e., no "overpasses"). Just as with MOSFET technology, planarity can be a severe constraint. But suppose a band of material (e.g., FQHE fluid) A is blocking a new band B which we wish to construct, might we break A, allow B to pass, use B for whatever purpose, break B, and then reconstitute A? If we could measure the charge around the resulting time-like hole γ in A (see FIG. 4) and if we found charge =1, it would be, as far as SU(2)—Chern-Simons theory were concerned, as if A were never broken.

Figure 5:
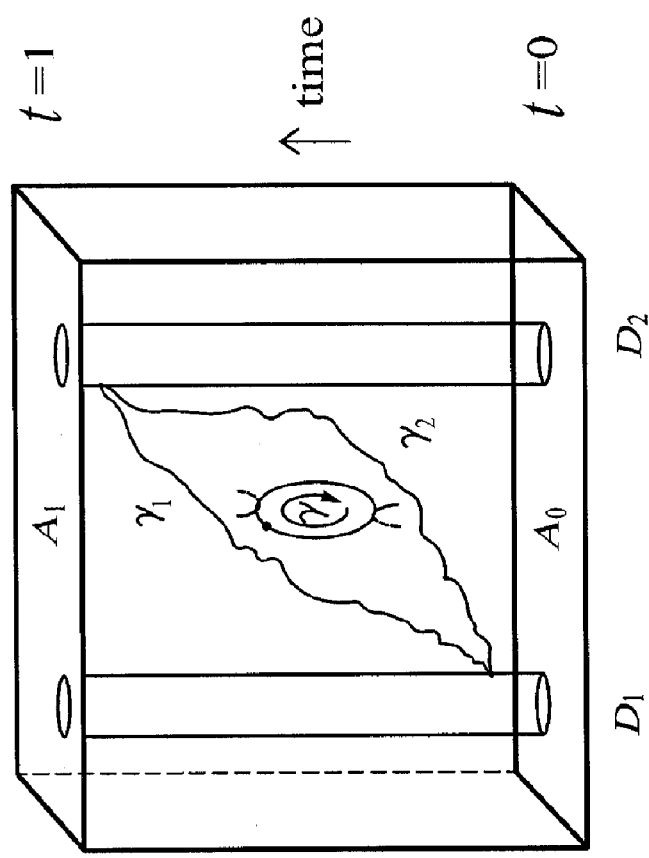
FIG. 5 depicts upper and lower tunneling trajectories.

In this vein, consider the resistance between anti-dots $D_1$ and $D_2$ contained in A over a period of time in which A is broken and rejoined. If this time A is broken is comparable to the tunneling time between $D_1$ and $D_2$ (and various delays such as tortuous contours of the FQHE fluid might be employed to achieve this) then the resistance should depend on differences between the upper $\gamma_1$ and lower $\gamma_2$ tunneling trajectories as in FIG. 5. We suppose, here, that the experimental set-up is such that current is injected into $D_1$ near $t_0$ then withdrawn from $D_2$ near time $t_1$.

We turn to the types of measurement needed to yield gates $g_1$ and $g_2$. In designing a gate, γ might become complicated, needing to avoid some regions of space-time and pass through others. In principle γ might be a knotted in (2+1)—space-time. Fortunately, we only will need to measure the topological charge on a loop γ with one max and one min in space-time (or a multi-loop where each component simultaneously shares this property).

For a simple loop on the boundary of (2+1)—space-time the projection into change super selection sectors $$\hat{1} = \bigotimes_{\text{charges } a} \hat{a}$$

is mathematically well defined. On the other hand, if γ lies in the interior a normal framing to γ is required define this define this decomposition (and different frames changes this decomposition by more than phase factors as would be the case for the S-matrix-conjugated decomposition). In the "untilted case," the time arrow supplies a natural normal frame. In the tilted case, to produce a normal frame, a "base-point" needs to be mathematically specified on the anti-dots. FIGS. 6A and 6B depict geometry for interferometry around a loop γ (with single space-time max and min) using one fixed anti-dot $D_1$ and one moving anti-dot $D_2$.

Let us consider the physical meaning of the framings on the Polyakov loop is and how it might be dictated. First, how do we think of a tunneling particle? As a Brownian path or a smooth arc? In the former case it might be impossible to assign a framing number, but energy considerations and the finite size of quasi-particles suggest that we should think that most of the amplitude across a tunneling junction is concentrated on the isotopy class of the obvious straight (and zero framed) arc across the junction. We assume that the quasi-particles do not carry angular momentum while they tunnel.

A similar issue arises if we transport a quasi-particle on a moving anti-dot. How do we control the rotation of the quasi-particle on the dot? This question is crucial, for without an answer, there is no distinction between doing (titled) interferometry on $\zeta_i$ with framing=$-1(\zeta_i-1)$ and interferometry on $(\zeta_i, 0)$. We will need to control the framing of the space-time arcs along which we transport antidots. A possible answer is to create an asymmetry: e.g., a "tear drop" shaped anti-dot so that it has a natural base point to record rotation. Whether this is another gimmick, such as using an impurity on an edge to serve as a base point, can control framing seems to depend on the detailed local physics and not be accessible from the effective low energy description, so lies outside the scope of this description. However, exercising experimental control of the framing along the legs of the interferometer appears to be an essential requirement.

Interferometry depends on maintaining a superposition among possible tunneling events. It will be challenging to avoid "measurement" as the geometry and/or position of $D_2$ in the FQHE fluid is changed, but we see no fundamental reason that this should not be possible. It has been suggested that a "bucket brigade" of anti-dots may be easier to implement than electro-statically moving an anti-dot. These approaches should be functionally equivalent.

The qubits to be manipulated are spanned by the two fusion channels in the Ising CFT:

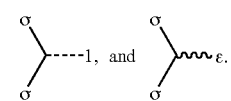

Equivalently, this degree of freedom may be expressed in a single time slice: Consider a twice punctured disk or "pants" P (as part of a larger medium) in which the two internal boundary components carry σ and the outer boundary carries 1 or ϵ defining the basis of the qubit $C^2$ (see FIG. 7). The qubits can be represented as in FIG. 8, or more compactly as for Wilson (Abrikosov) loop segments, as shown in FIG. 9.

The representation depicted in FIG. 10 follows from the braiding rules of the Ising TQFT. This gate requires no interferometry of any kind, it is simply a braid matrix. Unfortunately the braid matrices in the Ising TQFT define discrete subgroups of PSU(N) so we are forced to use interferometry (or forbidden topology) to complete the gate set.

The next gate we consider $$g_2 = \begin{vmatrix} 1 & 0 & 0 & 0 \\ 0 & 1 & 0 & 0 \\ 0 & 0 & 1 & 0 \\ 0 & 0 & 0 & -1 \end{vmatrix}.$$

It is a "controlled phase" gate. Since the F-matrix of the Ising CFT is the Hadamar matrix:

$$\frac{1}{\sqrt{2}} = \begin{vmatrix} 1 & 1 \\ 1 & -1 \end{vmatrix}$$

which conjugates $\sigma_x$ into $\sigma_z$, producing $g_2$ is equivalently powerful to producing but we $$\text{"controlled NOT"} = \begin{vmatrix} 1 & 0 & 0 & 0 \\ 0 & 1 & 0 & 0 \\ 0 & 0 & 0 & 1 \\ 0 & 0 & 1 & 0 \end{vmatrix},$$

follow BK in producing $g_2$.

First we recapitulate in a geometric language the BK description which involves time slices with "overpasses," i.e., FQHE fluids which cannot lie in the plane. Then we will rearrange the time coordinate and otherwise adjust the protocol so as we use only planar fluids in each time-slice. The price will be the need to use "titled interferometry" to project onto SU(2)—charge sectors along loops γ which are tilted in space-time.

The sum of the charges on the two resulting boundary components $\delta$ and $\psi$ (FIG. 11) is 1 or $\epsilon$ according to whether the charge along the overpass (dotted loop, α) is 1–$\epsilon$ or $\sigma$. This follows from the S-matrices of the theory:

$$S_{ij}^0 = \begin{vmatrix} 1/2 & \sqrt{2}/2 & 1/2 \\ \sqrt{2}/2 & 1/2 & -\sqrt{2}/2 \\ 1/2 & -\sqrt{2}/2 & 1/2 \end{vmatrix}$$

in basis: 1, σ, $\epsilon$. Furthermore $S_{\sigma,\sigma}^\epsilon = e^{i\pi/4}$ is the only nonzero entry for a punctured torus with boundary charge =$\epsilon$.

Ordinary, untilted, interferometry along $\psi$ projects into one of the states 1 or $\epsilon$. We hope to be in the sector charge $\psi$=1 and the probability of this is 0.5, because 1 and $\epsilon$ have equal quantum dimensions and therefore equal entropy. If we are disappointed, we simply break the overpass and then reconstitute it. Breaking the overpass returns the qubit to its original state. This follows from a general principle, which is described in the Appendix below, that adding quantum media is reversible simply by deleting what was added (whereas deleting quantum media is generally irreversible). Reconstituting the band yields an independent 0.5 chance of getting the desired trivial charge on $\psi$. We repeat as necessary until charge ($\psi$)=1 is observed. Now charge ($\delta$) and charge ($\alpha$) are perfectly correlated; charge ($\alpha$)=$\sigma$ ⟺ charge ($\delta$)=$\epsilon$ and charge ($\alpha$)=1 or $\epsilon$ ⟺ charge ($\delta$)=1.

Figure 15:
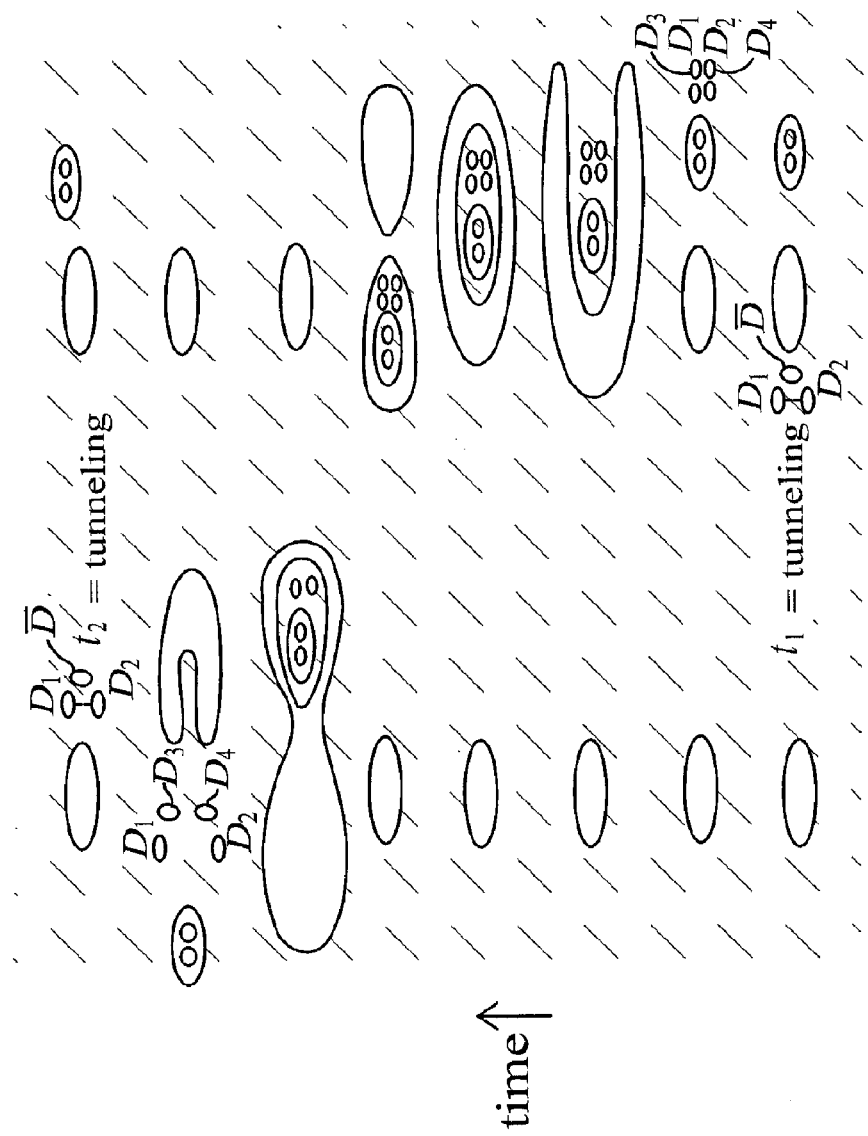
FIG. 15 depicts the gate realization of FIG. 14A reproduced in slices.
Figure 13:
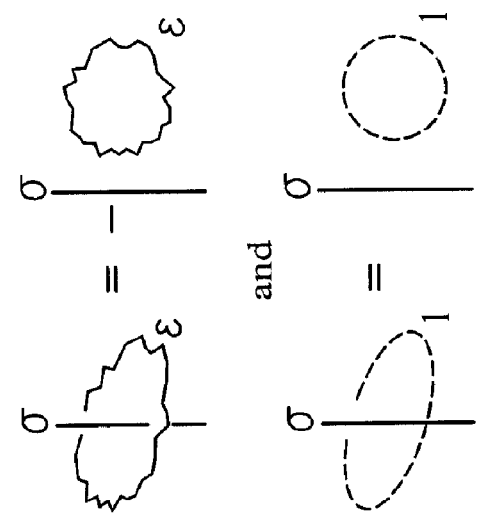
FIG. 13 depicts skein relations.

So far we have been manipulating the pants P supporting the control qubit. Now take the "controlled" qubit and pass it, as a body, around α (see FIG. 12). The skein relations shown in FIG. 13 tell us that the controlled qubit picks up a phase of –1 if it is in state $|\epsilon\rangle$ and is unchanged if it is in state $|1\rangle$. Finally, cut the overpass to return the two pants to their original position. The effect is $g_2$. FIG. 14 summarizes our reorganization of $g_2$. For clarity, FIG. 14 is reproduced (expect for the detour through ($\xi_1$)) in the slices in FIG. 15. To avoid clutter, we omitted an additional boundary component made from the space-time histories of the edges of an anti-dot D that divides into $D_3$ and $D_4$, which moves and later merges back into D as shown in FIG. 14B.

In FIG. 14A, we do ordinary interferometry along the $\xi$ curves and tilted interferometry along $\gamma = D_1 \times \text{time} \cup D_2 \times \text{time} \cup t_1 \cup t_2$. In other words, we begin forming the "overpass" band B, but now in space-time, and send the controlled qubit, $q_2$, down the "band" B as it is found. After a time, the right puncture of the pants supporting the control qubit, $q_1$ splits and we measure the SU(2)-charge along $\xi_1$, hoping to observe 1. This would mean that the channel (diagonal in FIG. 14) through which the band B is traveling does not disturb the structure of $q_1$.

There are four (equally likely if we neglect energetics associated to electric charge) topological charge splittings

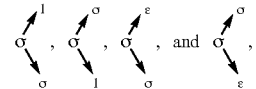

so there is a chance charge ($\xi_1$)=1. If charge ($\xi_1$)≠1, we fuse back (as shown) and try again until for some i>0, charge ($\xi_i$)=1 (i=2 in FIG. 14). When charge ($\xi_i$)=1 we continue the tube across the pants supporting $q_1$ into the left puncture. Terminate the band B on the left side of the left puncture, allowing $q_2$ to complete its passage through the time-tilted overpass B.

First, it is clear that the abortive attempts at building the band, $\xi_i, \ldots \xi_{i-1}$, to not affect the qubit $q_1$ (except possibly by an irrelevant overall phase): splitting a into b⊗c and then re-fusing results in the original particle type, ⊗ is a multiple of the ideality. The "control" qubit $q_1$ is clearly unaffected since the phase of the operator represent by the insert drawing is independent, by locality, of the state, 1 or $\epsilon$, of the overall qubit $q_1$.

As before, $q_1$ will control a phase gate $$\begin{vmatrix} 1 & 0 \\ 0 & -1 \end{vmatrix}$$

on $q_2$ if (i.e., iff and only if) the charge measure along $\psi$ is 1; $\psi$ in FIG. 14 is the difference of the two tunneling paths, $t_1$ and $t_2$ between the moving anti-dots $D_1$ and $D_2$. If $\epsilon$ is, instead, measured along $\psi$, then the gate has inadvertently interchanged the roles of 1 and $\epsilon$ within the controlling qubit $q_i$; a short calculation shows that $$\begin{vmatrix} 1 & 0 & 0 & 0 \\ 0 & -1 & 0 & 0 \\ 0 & 0 & 1 & 0 \\ 0 & 0 & 0 & 1 \end{vmatrix}$$

has instead been affected. This is not too serious since repeated application of the protocol gives a random walk in the group $Z_2 \oplus Z_2$ generated by $$\begin{vmatrix} 1 & 0 & 0 & 0 \\ 0 & 1 & 0 & 0 \\ 0 & 0 & 1 & 0 \\ 0 & 0 & 0 & -1 \end{vmatrix} \text{ and } \begin{vmatrix} 1 & 0 & 0 & 0 \\ 0 & -1 & 0 & 0 \\ 0 & 0 & 1 & 0 \\ 0 & 0 & 0 & 1 \end{vmatrix}.$$

Our ψ-measurements tell us where we are within $Z_2 \oplus Z_2$ as we randomly walk, we simply halt upon reaching $$\begin{vmatrix} 1 & 0 & 0 & 0 \\ 0 & 1 & 0 & 0 \\ 0 & 0 & 1 & 0 \\ 0 & 0 & 0 & -1 \end{vmatrix}.$$

The tails on "long walk" decay exponentially so this delay is acceptable.

Perhaps more serious is the fact that the anti-dots $D_1$ and $D_2$ must be threaded, along with $q_2$, through the band B. $D_1$ and $D_2$ should be kept outside tunneling range and the two σ charges inside the pants $P_2$ carrying $q_2$ must not be fused. This implies some geometric constraints. Clearly the size of the pants $P_1$ supporting $q_1$ must be enlarged, relative to the pants $P_2$ supporting $q_2$ before $q_1$ can be used to control the phase of $q_2$. This will be only one of many technological challenges.

With this example of a gate implementation in hand, it makes sense to discuss the general strategy and fundamental principles involved. The general 3-manifold M with boundary does not imbed in $R^3 = R^2 \times R$ but after puncturing M by removing a collection of proper arcs M'=M\arcs will imbed. If the linking circle to a puncturing arc is measured to have charge=1 then the puncture is irrelevant (at least within an SU(2)-Chern-Simons theory). Thus, the strategy is to find some protocol of puncturing and measuring which reduces the topologically intricate gates of BK to a sequence of planar time-slices.

Note that, in calculating the SU(2)-CS partition function Z for the space-time history of a puddle of $$v = \frac{5}{2} FQHE$$

fluid (see BK for algorithms), it is only the intrinsic topology of the resulting 3-manifold which is relevant and not imbedding in $R^3$. We give some example to clarify this important point. Our computations intentionally ignore linking not detectable within the space-time.

Figure 16A:
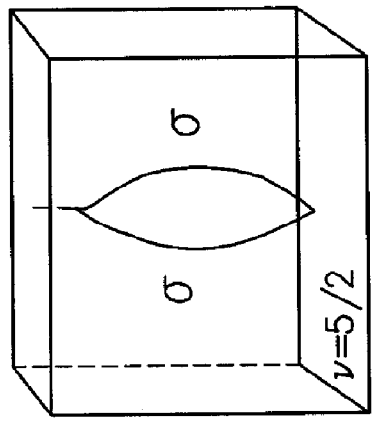
FIGS. 16A and 16B depict results when the fluid is rejoined and the σ's fused.
Figure 16B:
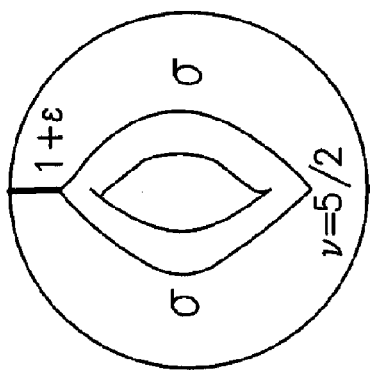
Figure 17:
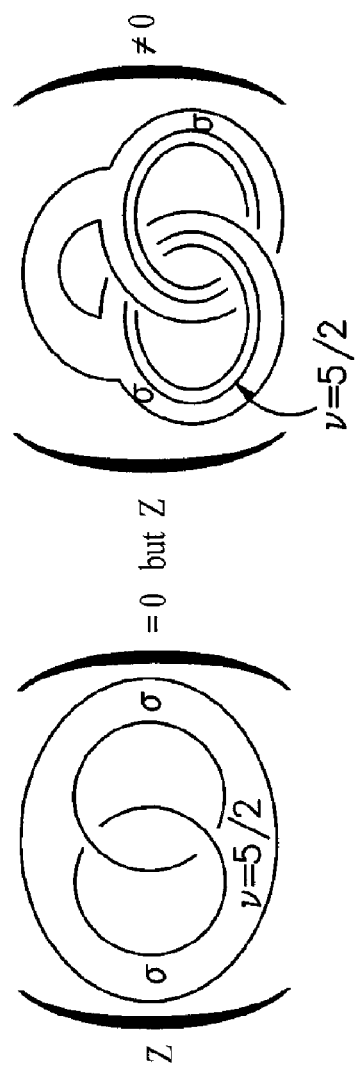
FIG. 17 shows that two simply linked σ trajectories cannot occur in a box of space-time fluid, but can occur if only part of the box is filled with 5/2's fluid.

Suppose a pair of σ's is pulled out of the vacuum and then fused. They will annihilate. If, however, after their births, the fluid is cut to separate them, all correlation is lost. If the fluid is then rejoined and the σ's fused the results will be 1 with probability ½ and ε with probability /1;2 (see FIG. 16). Similarly since the S-matrix entry $S_{94,\sigma}{}^1=0$ two simply linked σ trajectories cannot occur in a box of space-time fluid, but can occur if only part of the box is filled with ⅝'s fluid (see FIG. 17).

The preceding discussion applies only to the SU(2)-sector of the theory. We have been suppressing the fact that CFT modeling $$v = \frac{5}{2}$$

is a semi direct product of the Ising CFT (a variant of SU(2)-level=2) and a U(1)-semionic theory (U(1)-level=2) in order to concentrate on the more interesting nonabelian charges. Certainly, outside the FQHE space-time there is no sensible SU(2)-connection, which could mediate topological interaction. On the other hand, the U(1) gauge potential is that of ordinary electromagnetism and this pervades all of space-time and it will produce Arharonov-Bohm interactions without regarded to the boundaries of FQHE fluid. However, since the particles in this theory carry electric but not magnetic charges the U(1)-corrections are proportional to flux, A·B (see DFN) and easily made.

We turn now to the final gate $$g_1 = \begin{vmatrix} 1 & 0 \\ 0 & e^{\pi i/4} \end{vmatrix}.$$

The description in BK may be summarized as follows. First, Beginning with a qubit q on a pants P, attach a tube to P to obtain a punctured torus. This is done by first adding a band B and then measuring a charge 1 or ε on the new boundary component. If 1 is measured the tube is regarded as successfully attached; if ε is measured then break the band and try again. Then, let D be Dehn twist in the curve labeled α in FIG. 11. Act on T by $D^2$. Then, cut the band B to change T back into P. Steps 1, 2, 3 effect $g_1$. The computation follows from knowing the S-matrices and twist parameters θ. If q is in state $|1\rangle$, the charge along α is 1+ε, $\theta_1 = 1$ and $\theta_\epsilon = -1$, so under $D^2$, $(\theta_1)^2 = (\theta_\epsilon)^2 = 1$ is applied and no phase change occurs. On the other hand, if q is in state $|\epsilon\rangle$, then the charge along α is σ so $D^2$ changes phase by $(\theta_\sigma)^2 = (e^{i\pi/8})^2 = e^{\pi i/4}$. Note that if D were used instead if $D^2$, the result would not operate on the qubit since the charge on the internal punctures would not return to σ after the band B is cut: it would be $$\frac{1}{\sqrt{2}}(1+\varepsilon).$$

Our proposed implementation of $g_1$ closely follows this 3-step description. To understand the protocol, refer back to FIG. 14. Most of the figure depicts activity on P with the second pants $P_2$ being threaded through a passage roughly from southeast to northwest. Since $g_1$ is a 1-qubit gate, we dispense entirely with $P_2$; instead we thread two unlinked loops, with framing −1, $\zeta_1$ and $\zeta_2$ through this channel as sketch FIG. 18 (to be "overlain" on FIG. 14). We will need to use tilted interferometry to measure $\psi$, $\zeta_1$, and $\zeta_2$. Thus each $\zeta_i$, i=1,2, consists of a moving anti-dot $D_i$ carrying a $\sigma$-particle accompanied by companion anti-dots $D_i'$ and $D_i''$ (moving or in "bucket-brigade") with a well defined base point determining framing ($\zeta_i$–1). The role of $D_i$ is to carry a meridional $\sigma$-charge while tunneling $|t_1-t_2|$ is measured between $D_i'$ and $D_i''$.

We have added a new feature, we have assumed that in preparing the anti-dots $D_i$, that we can pull out of the vacuum and later annihilate at±pair of $\sigma$ s these have an electrostatic $$\text{charge} = (-1)^i \frac{e}{4}$$

so that they, topologically, carry $\sigma$. The reason for this constraint is to restrict to two cases 1 or $\epsilon$, the possible outcomes of each ($\zeta_i$,–1) measurement. Indeed the calculation for the change of basis from the meridial basis (in which s would surely be measured) to the ($\zeta_i$, –1)=L–M (longitude–meridian) is given by $S^{-1}T^{31\ -1}S|\sigma\rangle$ where $$S = \begin{vmatrix} 1/2 & \sqrt{2}/2 & 1/2 \\ \sqrt{2}/2 & 0 & -\sqrt{2}/2 \\ 1/2 & -\sqrt{2}/2 & 1/2 \end{vmatrix} \text{ and } T = \begin{vmatrix} 1 & 0 & 0 \\ 0 & e^{i\pi/8} & 0 \\ 0 & 0 & -1 \end{vmatrix}$$

in the $\{1,\sigma,\epsilon\}$ basis. We check that $S^{-1}T^{-1}S|\sigma\rangle = \sqrt{2}/2|1\rangle + \sqrt{2}/2|\epsilon\rangle$. This calculation will be justified below.

Ignoring the measurements $\xi_1 \ldots \xi_n$ which create the $|1\rangle$-labeled passage between the inner punctures of P as in FIG. 14A, we must execute three titled measurements along $\psi$, $\xi_1$, and $\xi_2$. We have just shown that in all cases the outcomes for charge ($\xi_1$) and charge ($\xi_1$) are independent and either 1 or $\epsilon$. We previously verified charge ($\psi$)=1 or $\epsilon$. From this it will follow that the protocol produces $$g_1 = \begin{vmatrix} 1 & 0 \\ 0 & e^{\pm\pi i/4} \end{vmatrix}$$

iff charge ($\psi$)=1 and $$\begin{vmatrix} e^{\pm\pi i/4} & 0 \\ 0 & 1 \end{vmatrix}$$

iff charge ($\psi$)=$\epsilon$, where + occurs if charge ($\xi_1$)·charge ($\zeta_2$)=1 and – if charge ($\zeta_1$)·charge ($\zeta_2$)=$\epsilon$. The notation used herein is motivated by fusion rules: $1 \otimes 1 = 1, 1 \otimes \epsilon = \epsilon \otimes 1 = \epsilon$, and $\epsilon \otimes \epsilon = 1$. In all eight measurement outcomes we have, up to an overall phase, implemented either $g_1$ or $g_1^{-1}$. Thus our protocol generates a random walk on Z/8Z determined by a fair coin and since we know the measurement outcomes we may iterate the protocol until we arrive at $g_1$. Again this is efficient.

Figure 18:
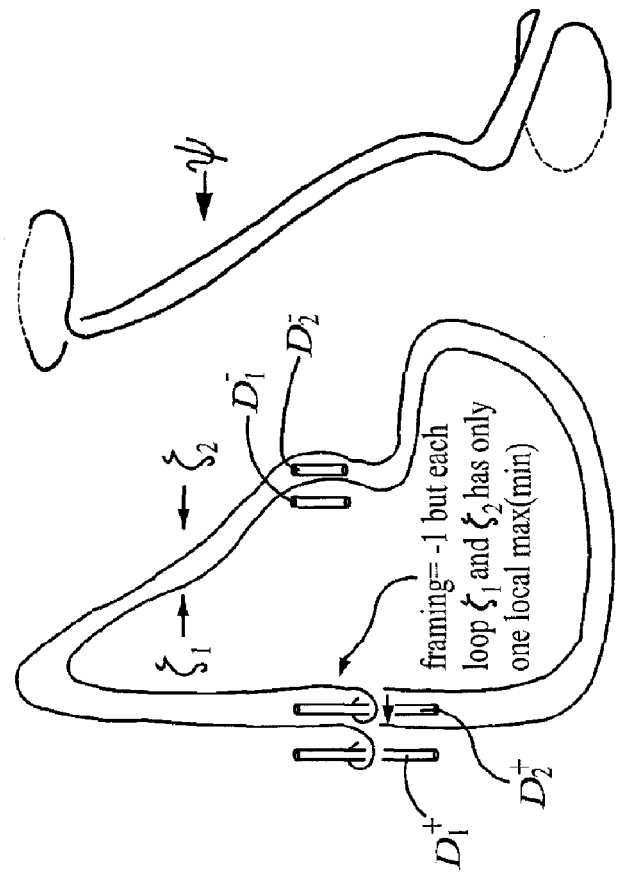
FIG. 18 depicts a realization of a controlled π phase gate $g_1$.

It should be understood that, in terms of BK, measuring charge $\psi$ as in FIG. 18, corresponds to measuring the charge on $\psi$ of FIG. 11. Measuring the charges on $\zeta_1$ and $\zeta_2$ correspond to the double Dehn twist in a manner which will now be described.

As described above, projection to charge sectors on a loop $\gamma$ does not become well-defined (or even the eigenspaces themselves) until $\gamma$ has a normal framing. If the physical Hilbert space V(T) for a torus T is V=span $\{1, \sigma, \epsilon\}$ in the longitudinal basis L if we wish to transform to the framing=k basis, L+kM=longitude+k(meridian), we must compute as follows:

$$= (L,M) \xrightarrow{S} (M, L) \xrightarrow{\text{twist}^k} (M, L + kM) \xrightarrow{S^{-1}} (L + kM, M)$$

the composition given by: $S^{-1}T^kS$.

Figure 19:
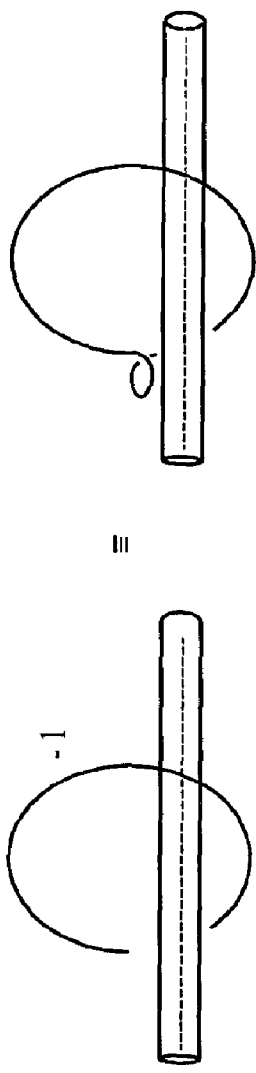
FIG. 19 depicts a +1-Dehn twist.

The curves $\zeta_1$ and $\zeta_2$ have been described as having framing=–1 this means the tip of the frame vector links –1 with its base as it moves around the loop and that k, above is –1. It is a fundamental identity of the "Kirby calculus" that –1—framed surgery on a simple linking circle imparts a +1-Dehn twist, as depicted in FIG. 19.

The meaning of "surgery," as that term is used herein, is that a tubular neighborhood of the loop is deleted and then glued back so that the meridian disk is glued to the circle defined by the tip of the frame vector. Obviously, we can neither twist nor surger Gallium Arsenide, but if we measure the particle content of a (framed) loop $\gamma$ in the interior of a 2+1-dimensional space-time, and the result is 1, we have (up to an overall normalization factor, corresponding to capping a 2-sphere) accomplished surgery on $\gamma$ as far as Chern-Simons theory is concerned. Similarly, if we measure a nontrivial particle $\sigma$ or $\epsilon$ we have still done a kind of surgery but now the reglued solid torus has a particle "Polyakov loop" ($\sigma$ or $\epsilon$ resp.) running along its core. This is $\sigma(\epsilon)=Z$ (solid torus, Polyakov loop) $\epsilon V(T^2)$ expressed in meridinal basis.

From the S-matrices, we know that (w.r.t., the labeling in FIG. 11) charge ($\alpha$)=1–$\epsilon$iff charge ($\psi$)·charge ($\delta$)=1 and charge ($\alpha$)=$\sigma$iff charge ($\psi$)·charge ($\delta$)=$\epsilon$. Thus the nontrivial phase arises in the upper left or lower right entry of our gate-matrix according to whether charge ($\psi$)=1 or $\epsilon$.

In translating between FIGS. 11 and 18, $\alpha$ corresponds to untwisted copies of the $\zeta$'s, ($\zeta_1$,0) and ($\zeta_2$,0). Measuring ($\zeta_1$,–1) and ($\zeta_2$,–1) results in a squared Dehn twist around $\alpha$ with two Polyakov loops appearing, labeled by some particle type 1 or $\epsilon$, (but not $\sigma$!) parallel to $\alpha$, say at $\alpha \times \frac{1}{3}$ and $\alpha \times \frac{2}{3}$ in a product structure.

Figure 20:
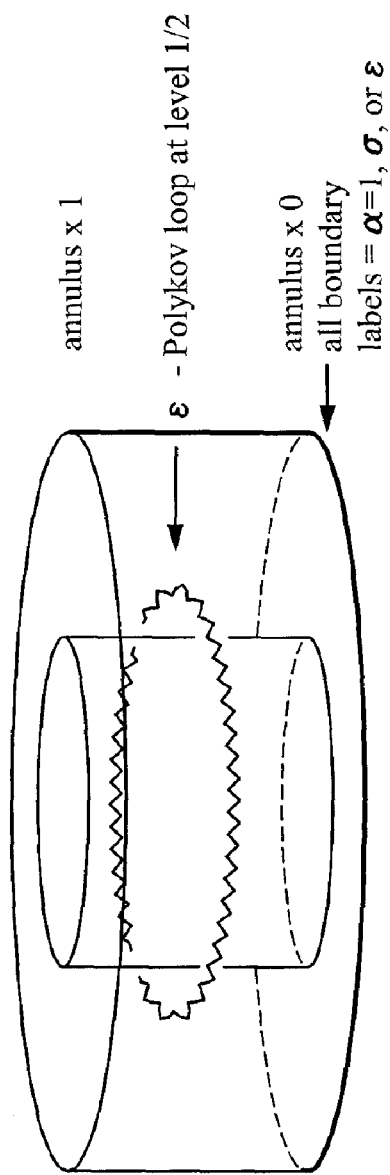
FIG. 20 depicts an ε-Polyakov loop at level 1/2.

The Polyakov loops cannot carry $\sigma$ since $S^{-1}T^{-1}S|\sigma\rangle = \sqrt{2}/2|1\rangle + \sqrt{2}/2|\epsilon\rangle$. Because two $\epsilon$'s must fuse to 1, only the total charge, charge ($\zeta_1$,–1)·charge ($\zeta_2$,–1)=1 or $\epsilon$ is relevant to the action of the gate. There are two cases: when charge ($\delta$)·charge ($\epsilon$)=1, then charge ($\alpha$)=1–$\epsilon$, and the effect of an $\epsilon$-Polyakov loop can be localized as that of a $\epsilon$-core circle$\times \frac{1}{2}$ in annulus$\times[0, 1]$, where the boundaries of the annulus are labeled by $|1\rangle$ (or $|\epsilon\rangle$). With either labeling, the $\epsilon$-Polyakov loop contributes no additional phase. In contrast, in the second case when charge ($\delta$)·charge ($\psi$)=$\epsilon$ and charge ($\alpha$)=$\sigma$, the localized model is an $\epsilon$-Polyakov loop at level $\frac{1}{2}$ in annulus$\times [0, 1]$ with boundaries labeled by $\sigma$ (see FIG. 20). In this case the Polyakov loop contributes a phase-1. The phase which the $\epsilon$-Polyakov loop adds to the identity (product) morphism is:

$$\langle\bigcirc\rangle = 1, a=1; \langle\bigcirc\!\!\!\supset\rangle = -1, a=\sigma; \text{and} \langle\bigcirc\!\!\!\supset\rangle = 1, a=\epsilon.$$

Thus it has been shown that our protocol implements $g_1$ or $g_1^{-1}$ according to whether charge ($\psi$)·charge ($\zeta_1$, –1)·charge ($\zeta_2$,–1)=1 or $\epsilon$.

The Effect of Adding or Deleting 1-Handles to Pants ×I.

Figure 21:
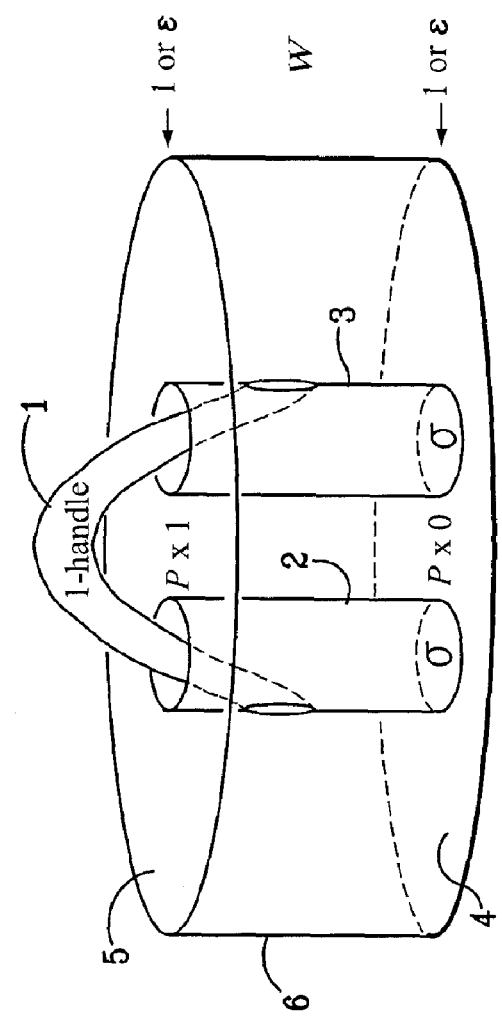
FIG. 21 depicts a W=P×I∪1-handle.

The time history of adding and then breaking a band between the inner boundary components β,ω or a twice punctured disk P is topologically the addition of a 1-handle ($D \times D^2$, $\partial D^1 \times D^2$) to P×I; call the result W=P×I∪1-handle (see FIG. 21). As shown in FIG. 21, W is drawn with time ≠ Z-coordinate since the add/break procedure for the band B does not imbed in (2+1)-dimensions.

While it is axiomatic that products correspond in a TQFT to identity morphisms, it is a small calculation that W induces the identity (rather than say a phase gate) on the qubit supported on P. The general principle is that if a surface which bounds a 3-manifold is broken up into sub-surfaces by (particle) labeled loops, then the 3-manifold canonically specifies a vector in the tensor product of the (relative) physical Hilbert spaces.

Letting x=1 or ε for the outer label, W specifies a vector ψ in: $V_{0,0} \otimes V_{0,o,o} \otimes V_{0,o,o} \otimes V_{o,o,x} \otimes V_{o,o,x}{}^* \otimes V_{x,x}$, where the factors come from subsurfaces 1, ..., 6 in FIG. 21. The zero label in the first three factors is dictated by the presence of the disks in W capping the boundary of the first component (a cylinder). The gluing axiom [W] or [T] tells us that removing the 1-handle determines a canonical isomorphism to Z(P×I) carrying $\psi_1$ to $\psi_0$ in $V_0{}^* \otimes V_0 \otimes V_0$, $o,o \otimes V_{0,o,o} \otimes V_{o,o,} {}_x \otimes V_{o,o,x}{}^* \otimes V_{x,x}$. After supplying the canonical base vectors $\beta_0{}^* \epsilon V_0{}^*$, $\beta_{0,o,o} \epsilon V_{0,o,o}$ and $\beta_{x,x} \epsilon V_{x,x}, \psi_1$ is canonically identified with idε. Hom $(V_{o,o,x}) \cong V_{o,o,x}{}^* \otimes V_{o,o,x}$. Note that no x-dependent phase has entered the calculation. Thus we have proved, in the abstract language of TQFTs, that adding and then breaking a band induces the identity operator on the qubit supported in P.

The situation is rather different if, instead we cut out a band to join the internal punctures and then restore it. In other words, fuse the internal punctures and then separate them. We will even assume that we can use the electric charge of the σ, which we take to be $$+\frac{e}{4}$$

on both punctures to ensure that is energetically favorable (and hence necessary) that when we split the previously fused puncture back in two, each resulting puncture again carries $$+\frac{e}{4}$$

charged σ. Our calculation will show that even in this situation we have not acted on the P-qubit via the identity by rather a POVM $$a \cong \begin{vmatrix} 1 & 0 \\ 0 & 1 \end{vmatrix} + \beta \cong \begin{vmatrix} 1 & 0 \\ 0 & -1 \end{vmatrix}$$

where α(β) is the probability for γ in FIG. 22 to carry charge 1(ε). Thus, in general, operations that add quantum media (in this case ⅝-FQHE fluid) are reversible—simply delete what was previously added, whereas operations which delete are often irreversible.

In particle flight (Feynmann diagram) notation FIG. 22 is either FIG. 23A or FIG. 23B, according to the charge of γ. FIG. 23A certainly represents the identity acting on the P-qubit. The operator given by FIG. 23B is clearly diagonal in the (1,ε)basis. To compute the phases of the diagonal entries we pair with the orthonormal exterior basis, (◯, $\sqrt{2}$◯) and use the Kauffman relations to extract expectation values. In case a we get:

$$\bigcirc = \sqrt{2}, \text{ and}$$

$$\sqrt{2}\bigcirc = \sqrt{2}\bigcirc - \sqrt{2}\left(\frac{1}{\sqrt{2}}\right) = 2\sqrt{2} - \sqrt{2} = \sqrt{2}.$$

In this case b we get:

$$\sqrt{2} = \bigcirc = \sqrt{2}\bigcirc - \sqrt{2}\left(\frac{1}{\sqrt{2}}\bigcirc\right) = 2\sqrt{2} - \sqrt{2} = \sqrt{2}, \text{ and}$$

$$2\bigcirc = 2\left(\bigcirc - \frac{1}{\sqrt{2}}\bigcirc - \frac{1}{\sqrt{2}}\bigcirc + \frac{1}{2}\bigcirc\right) = \sqrt{2}\left(-\frac{\sqrt{2}}{2}\right) = -\sqrt{2}.$$

The strange $\sqrt{2}$ factor is actually $S_{00}=S_{\epsilon\epsilon}$ which has entered because we have not rescaled the dual physical Hilbert space by $1/S_{xx}$ prior to gluing. Taking this axiomatic factor into account (see BK, for example, or Walker, On Witten's 3-manifold invariants), we obtain the claimed formula.

Example Computing Environment

Figure 24:
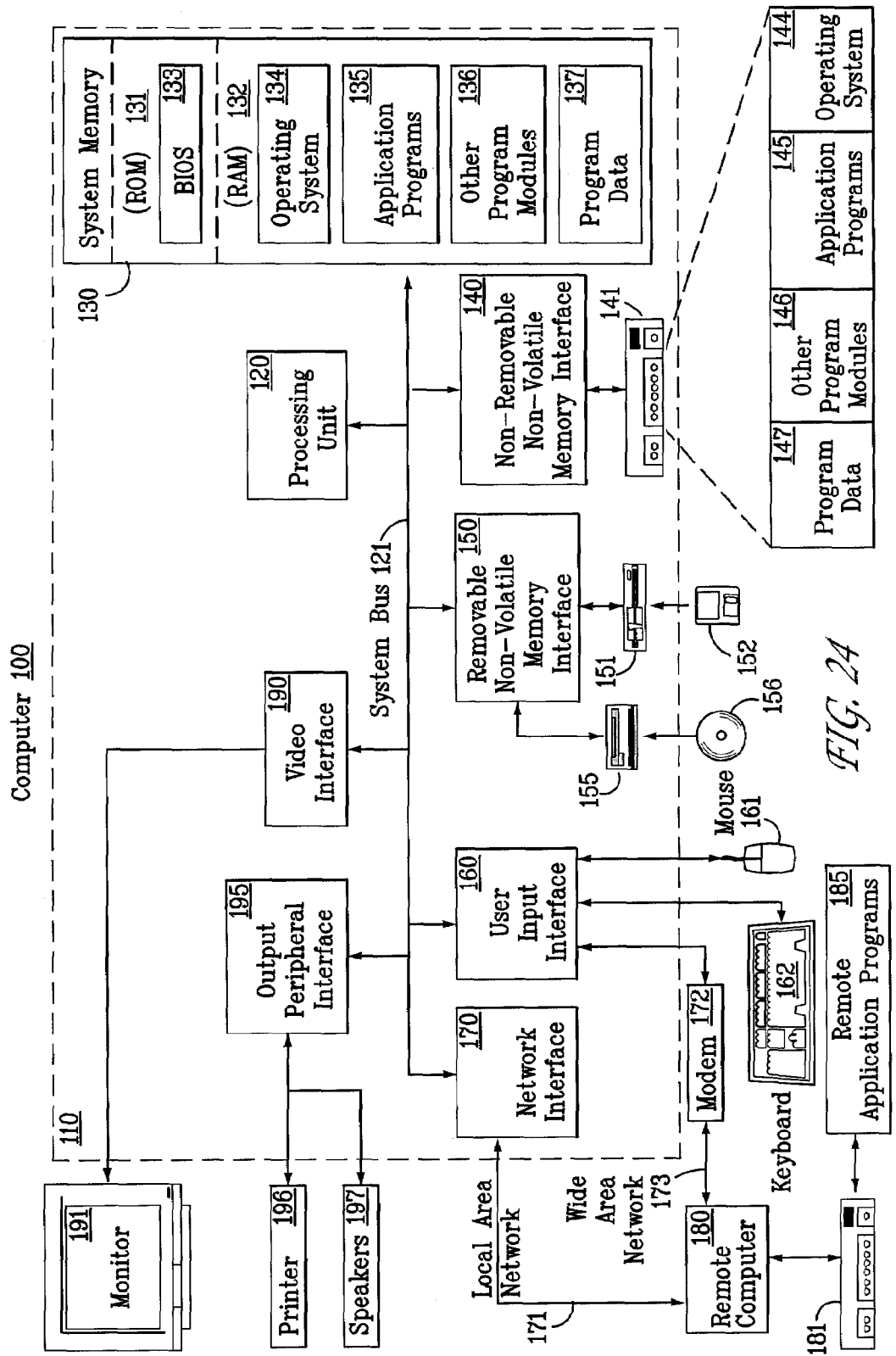
FIG. 24 is a block diagram showing an example computing environment in which aspects of the invention may be implemented.

FIG. 24 and the following discussion are intended to provide a brief general description of a suitable computing environment in which an example embodiment of the invention may be implemented. It should be understood, however, that handheld, portable, and other computing devices of all kinds are contemplated for use in connection with the present invention. While a general purpose computer is described below, this is but one example. The present invention also may be operable on a thin client having network server interoperability and interaction. Thus, an example embodiment of the invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 24 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 24, an example system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 24 illustrates operating system 134, application programs 135, other program modules 136, and program data 137. RAM 132 may contain other data and/or program modules.

The computer 110 may also include other removable/non-removable, volatile/nonvolatile computer storage media. By way of example only, FIG. 24 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 24 provide storage of computer readable instructions, data structures, program modules and other data for the computer 110. In FIG. 24, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120*a-f* through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 24. The logical connections depicted in FIG. 24 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 24 illustrates remote application programs 185 as residing on memory device 181. It will be appreciated that the network connections shown are exemplary and other means of establishing a communications link between the computers may be used.

One of ordinary skill in the art can appreciate that a computer 110 or other client devices can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

Though the invention has been described in connection with certain preferred embodiments depicted in the various figures, it should be understood that other similar embodiments may be used, and that modifications or additions may be made to the described embodiments for practicing the invention without deviating therefrom. The invention, therefore, should not be limited to any single embodiment, but rather should be construed in breadth and scope in accordance with the following claims.

What is claimed:

1. A logical gate for a quantum computer, the logical gate comprising:
    a fractional quantum Hall effect (FQHE) fluid;
    a first antidot defined by a first absence of the FQHE fluid;
    a second antidot defined by a second absence of the FQHE fluid;
    a voltage supply for adjusting an electrical potential confining the FQHE fluid to form a Polyakov loop between the antidots; and
    means for determining from the output current a quantum state of the Polyakov loop.

2. The logical gate of claim 1, wherein the voltage supply enables adjustment of the electrical potential to cause a separation between the antidots.

3. The logical gate of claim 2, wherein the separation prevents tunneling between the antidots.

4. The logical gate of claim 2, wherein the separation is a gap in the FQHE fluid between the antidots.

5. The logical gate of claim 4, wherein the voltage supply enables adjustment of the electrical potential to heal the gap.

6. The logical gate of claim 1, wherein the FQHE fluid is formed at an interface between first and second crystals.

7. The logical gate of claim 6, wherein the first crystal is a gallium arsenide crystal.

8. The logical gate of claim 7, wherein the second crystal is an aluminum gallium arsenide crystal.

9. The logical gate of claim 1, further comprising:
    means for determining whether the quantum state of the Polyakov loop corresponds to a state carrying trivial SU(2) charge |1>.

10. The logical gate of claim 1, further comprising:
    means for determining whether the quantum state of the Polyakov loop corresponds to a state carrying a fermionic SU(2) charge |ϵ>.

11. The logical gate of claim 1, wherein the FQHE fluid is a $v=5/2$ quantum Hall effect fluid.

12. A method for implementing a logical gate in a quantum computer, the method comprising:
    providing a fractional quantum Hall effect (FQHE) fluid wherein a first antidot is defined as a first absence of the FQHE fluid and a second antidot is defined as a second absence of the FQHE fluid;
    providing a voltage supply for adjusting an electrical potential confining the FQHE fluid to form a Polyakov loop between the antidots; and
    determining from the output current a quantum state of the Polyakov loop.

13. The method of claim 12, wherein the voltage supply enables adjustment of the electrical potential to cause a separation between the antidots.

14. The method of claim 13, wherein the separation prevents tunneling between the antidots.

15. The method of claim 13, wherein the separation is a gap in the FQHE fluid between the antidots.

16. The method of claim 15, wherein the voltage supply enables adjustment of the electrical potential to heal the gap.

17. The method of claim 12, wherein the FQHE fluid is formed at an interface between first and second crystals.

18. The method of claim 17, wherein the first crystal is a gallium arsenide crystal.

19. The method of claim 18, wherein the second crystal is an aluminum gallium arsenide crystal.

20. The method of claim 12, wherein the FQHE fluid is a $v=5/2$ quantum Hall effect fluid.

* * * * *